Feb. 21, 1928.

R. McA. ALTHOUSE 1,659,647

SEA CRANE

Filed Jan. 14, 1927

INVENTOR
ROBERT M. ALTHOUSE
BY
Newell + Spencer
ATTORNEYS

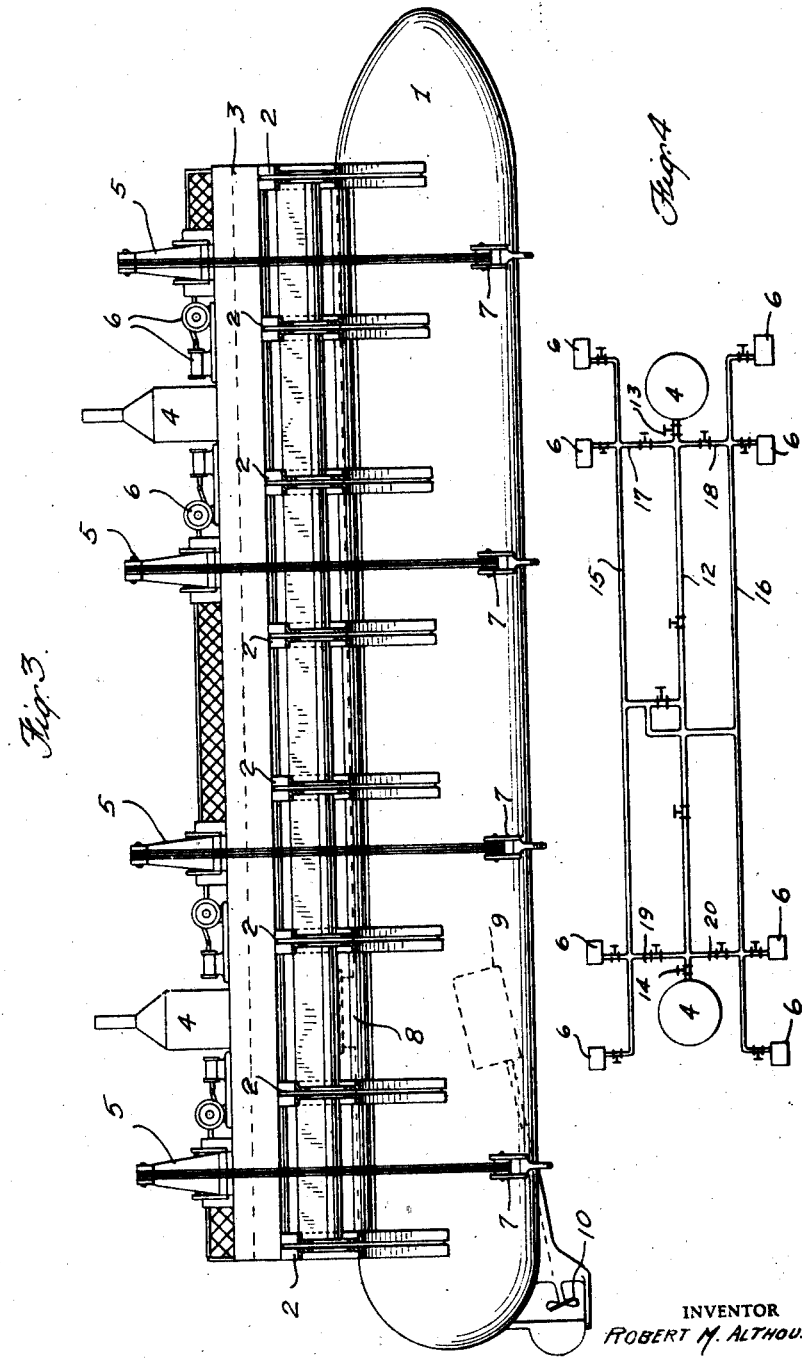

Patented Feb. 21, 1928.

1,659,647

UNITED STATES PATENT OFFICE.

ROBERT McALLISTER ALTHOUSE, OF COATESVILLE, PENNSYLVANIA.

SEA CRANE.

Application filed January 14, 1927. Serial No. 161,043.

This invention relates to sea cranes and more especially to cranes for lifting sunken ships such as, for example, submarines.

In the past, sunken ships such as submarines, have been raised to the surface by attaching numerous small pontoons to the sunken vessel usually by passing a sling around the vessel and connecting it to a pontoon on either side. This method of raising ships has proved very unsatisfactory in many ways and is open to a number of serious disadvantages. In the first place, the pontoons have to be sunk attached to the vessel to be lifted and then the water driven out of the pontoons, all of which entails a large amount of work under water and in most cases this work is of a highly dangerous character. Even when the vessel is actually floated the buoying by means of pairs of small pontoons makes it difficult to tow the vessel, as there is a constant tendency for the slings to shift, owing to the fact that each individual pontoon is acted upon by the waves and there is no longitudinal bracing.

The present invention obviates the disadvantages of the previous methods and apparatus and permits the raising of sunken vessels simply and easily and greatly minimizes the difficulties of towing. A further advantage lies in the fact that small vessels such as submarines can be lifted to the surface or even above the water, so that there is no trouble due to the greater draft of the partially sunken vessel, and in many cases it is also possible to make repairs so that the vessel will float without requiring towing into a dry dock. Other and further advantages will be apparent from the more detailed description of the invention which follows.

According to the present invention a crane or crane ship is constructed having a pair of longitudinal pontoons or hollow hulls held together by a trussed central deck structure which also carries hoisting apparatus. In order to raise a sunken vessel the crane ship, which is preferably provided with means for propulsion, is positioned lengthwise and over the sunken vessel. Cables or other suitable hoisting means are then lowered from the braced central deck and attached to the sunken vessel either by passing the cables underneath the vessel in form of slings or by attaching cables to the vessel by any suitable means. The sunken vessel is raised by the hoisting means until it is brought to the surface or but little below the surface and the crane ship then proceeds to port with the sunken vessel hung suspended from its central deck structure. In the case of smaller vessels, such as submarines, it is advantageous in some cases to lift the vessel clear of the water which is possible with cranes having a relatively high central deck structure. While thus suspended partly or wholly out of the water it is possible to drain out the water in the sunken craft and in many cases to make repairs which may be sufficient to permit the vessel to float without further assistance.

The time required to raise a sunken vessel is greatly reduced since it is only necessary to attach the hoisting cables and then raise the vessel quickly and easily by the power hoists. It is unnecessary to submerge pontoons and then force out the water and thus a great deal of expensive and dangerous under-water work is eliminated. The time factor is also of great importance since frequently ships are sunk in water that are subject to severe storms. In the methods used in the past where it frequently takes from a week to many months to raise a vessel, the work is interrupted and in some cases destroyed by severe storms, whereas by means of a crane ship according to the present invention, the raising work is cut from weeks and months to days and it is possible to complete the raising during a single spell of fine weather.

The present invention is applicable to the raising of vessels from any depth to which a diver can descend or even in some cases to a greater depth if it is possible to provide for automatic attachment of the hoisting cables to the sunken vessels. The present invention is, however, peculiarly effective for the raising of small vessels such as submarines which may be sunk in relativley shallow water or where it is necessary to traverse shallow water to bring the vessels finally into port. The immense pontoon hulls of the crane ship draw relatively little water and it is possible to raise the sunken vessel to such a point that the draft in many cases is no greater than the normal draft of the vessel and in some cases to float off vessels which have stuck in shallow water and this is an additional advantage of the present invention.

Typical embodiments of the invention will be described in detail in connection with the annexed drawings, in which—

Figure 3 is a vertical section taken along the lines 3—3 of Figure 1; and

Figure 4 is a diagrammatic illustration of the steam lines feeding the hoists in the construction shown in Figures 1 and 3.

Figure 1:
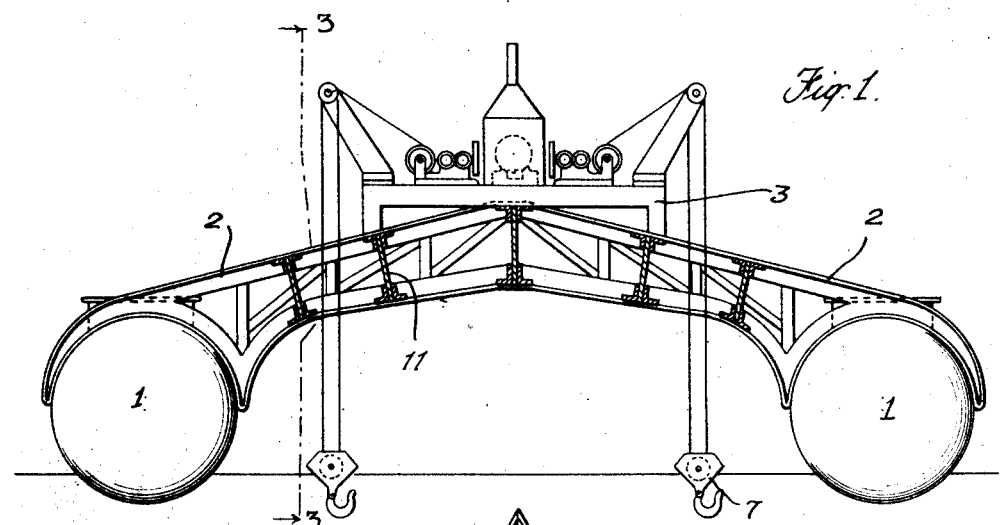
Figure 1 is a vertical section through a crane ship of the present invention.

In the construction shown in Figures 1 and 3 the crane ship consists in two long pontoons or hulls 1 spread far apart and connected together with trussed girders 2 at suitable intervals. The girders form an obtuse angle and support at their central portion a hoisting deck 3 which is provided with two boilers 4 and four pairs of hoists 5, each driven by its own steam donkey engine 6. The hoists are shown as equipped with cables ending in large hooks 7. Entrance to the hulls or pontoons may be effected through suitable hatches 8 and living quarters for the crew may be provided either on the hoisting deck or within the pontoons themselves. Propulsion is effected preferably by engines in each pontoon which are shown schematically in Figure 3 as Diesel engines 9 driving propellers 10. If desired, of course, steam engines may be provided fed by steam from the hoisting boilers but in general it is preferable to provide the pontoons with independent driving means because the girder structure supporting the deck, which frequently must have a span of 100 or more feet, is necessarily subject to a certain amount of flexing despite the fact that it is braced by longitudinal girders 11, and it is usually undesirable to carry steam piping for a long distance from the boiler where there is possibility of breakage of the pipes through flexing of the structure. Where, however, the steam from the boilers is used to generate electricity the pontoons may simply be driven by electric motors. In general, the type of power and drive both for propulsion and hoisting is in no sense to be limited to the designs shown in the drawings which are merely illustrative of the invention and any suitable type of power or drive may be used.

Figure 2:
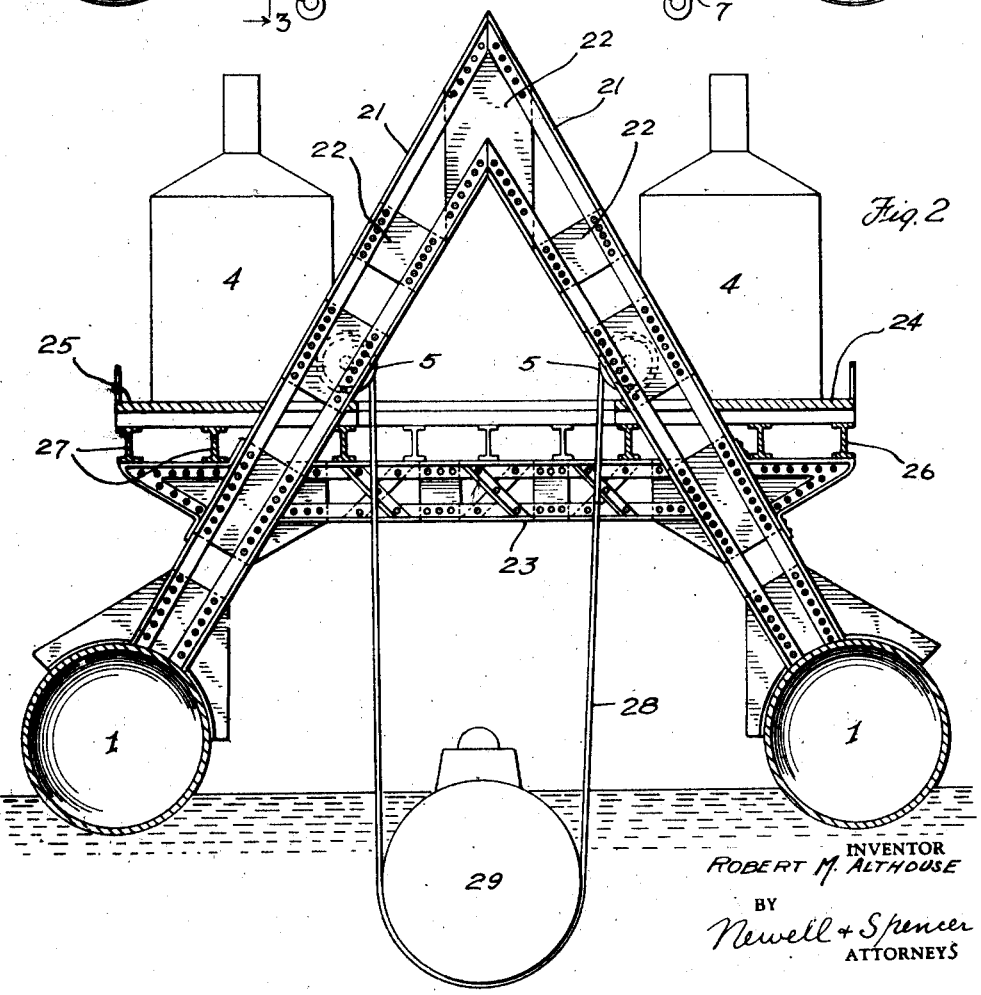
Figure 2 is a similar section through a modified form of construction.

It is usually desirable in raising a sunken ship to pull evenly on all of the hoisting cables in order to prevent straining of the sunken hull. This necessitates for most purposes connecting the hoisting engines together, so that they are controlled by a single throttle. However, it is also desirable to be able to run each hoisting engine independently so as to take up the slack on the hoisting cables before the sunken vessel is lifted and in some cases it may also be necessary or desirable to run the engines independently as, for example, where a vessel is stuck on a sand bar and it is only necessary to lift one end or where the vessel is considerably shorter than the crane ship and it may be desirable to use a smaller number of hoists. A method of steam distribution which can be used effectively is shown diagrammatically in Figure 4, a main steam pipe 12 connecting the two boilers 4 and being provided with throttles 13 and 14 at the boilers respectively. Common steam lines 15 and 16 for the hoisting engines on each side of the deck connect to the main pipe 12 through the valved pipes 17, 18, 19 and 20, and each individual engine is connected through a valved pipe to either the pipes 15 or 16, as the case may be. It is thus possible to conduct steam from either boiler to any of the engines and the engines may be controlled either together by means of the throttle valves 13 and 14, or individually by means of the individual throttle valves connected to each engine or all the engines on one side may be operated independently of the engines on the other side, taking steam from one or both boilers. Other combinations will be apparent to the skilled engineer from a consideration of the diagram in Figure 4.

Where the vessels lifted are relatively light or the span between pontoons is not excessive, the type shown in Figures 1 and 3 is very satisfactory and can be built economically. Where greater span between the pontoons is required or where the weights to be lifted are very large, the system of transverse bracing girders shown in Figures 1 and 3 will sometimes be insufficient or would necessitate unduly heavy construction. In such cases a modified structure such as that shown in Figure 2, may be utilized. Here two supporting transverse girders 21 are firmly attached to the pontoons and rise to a considerable height, forming an acute angle. They are braced by longitudinal girders shown at 22. Horizontal transverse girders 23 are swung across the girders 21 to form a triangular brace and two side hoisting decks 24 and 25 are supported on longitudinal girders 26 and 27 and carry the hoisting boilers 4. The hoists 5 themselves are preferably hung directly from the girders 21 and are shown as operated with a sling cable 28 which is shown as supporting a sunken submarine 29. Obviously, of course, the hoists may use hooks as shown in Figure 1 and vice versa.

The sharp angle of the girders 21 and the great stiffness imparted by the transverse bracing 23 renders the structure one of great rigidity and capable of suspending a tremendous downward pull which is necessary when lifting heavy vessels. This structure is much stronger against lateral thrust on the pontoons than is that shown in Figure 1 and for this reason is suitable for the construction of crane ships to be operated in relatively rough waters. Other methods of bracing and designs of transverse construction may be used where desirable. The drawings illustrate merely typical embodiments of the invention and are not intended to limit its scope.

It will be seen that the present invention constitutes a simple and effective means for rapidly and efficiently raising sunken vessels and transporting them to port without additional towing means. In addition to its advantages as a rapid and effective means for raising vessels which permits utilization in spells of good weather, the structure is also sea-worthy and capable of withstanding heavy weather when built strongly. The two pontoons provide a structure similar to the well known sea sleds, which structure is common for certain types of shallow draft, fast motor boats and produces a very sea-worthy structure having a minimum draft. Round pontoons have been shown but, of course, they may be of any other shape which may prove desirable. The round shape, I have found very satisfactory and to give maximum strength for a given weight of material but in many cases it may be desirable for structural or other reasons to adopt a different pontoon cross-section and the invention is in no sense limited to round pontoons. In general the drawings are largely diagrammatic in nature as the exact details of the individual structures do not for the most part constitute a part of the present invention and must be chosen with due regard to the conditions under which the device is to operate.

The drawings illustrate two typical embodiments of the invention. It should be understood, however, that the invention is not limited to the arrangement therein shown. Thus, for example, it may be desirable in some cases to make hulls of a plurality of pontoons rigidly braced longitudinally so that they behave in effect as a single pontoon. It may also be desirable in some cases to have hoists which operate on booms extending beyond the pontoons so as to lift vessels which lie alongside of the sea crane instead of beneath it. By this means, it is possible for two crane ships to lift a vessel which would be too broad for either to handle alone.

The drawings illustrate merely two embodiments of the present invention and it should be understood that the comparative size shown is in no sense of the essence of the invention. Sea cranes of any suitable size can be made and the number and arrangement, as well as the structural detail of the hoists, will be chosen with due regard to the conditions under which the crane is to operate.

While the invention has been described primarily in connection with the salvaging of sunken vessels or of vessels which have become stranded, it is not limited to such uses and the sea cranes of the present invention may be used in many cases advantageously for handling heavy material in the building of foundations or piers beneath the surface of harbors, in the construction of light houses, bridges and similar structures, and in the sinking of protectors for building piers. In other words, wherever it is necessary to handle large and heavy material under water, the present invention can be applied with great advantage.

What I desire to secure by Letters Patent of the United States and claim is:

1. In a sea crane, two longitudinally rigid pontoon hulls spaced apart, transverse bracing girders connecting said hulls and being in the form of inverted V's, horizontal transverse bracing girders across said V's and attached thereto, a deck structure supported by said girders, and hoisting means operating from said deck.

2. A sea crane according to claim 1, in which horizontal girders extend beyond the legs of the V-shaped transverse girders, and support two hoisting deck structures located outside the V, hoisting power means on said deck structures and hoists operating therefrom, said hoists being provided with direct attachment to the V girders whereby the latter take the vertical strain of hoisting.

Signed at Coatesville, Pennsylvania, this 7th day of January, 1927.

ROBERT McALLISTER ALTHOUSE.